(No Model.)
W. T. FOX.
TANK VALVE FOR WATER CLOSETS.
No. 557,659.  Patented Apr. 7, 1896.
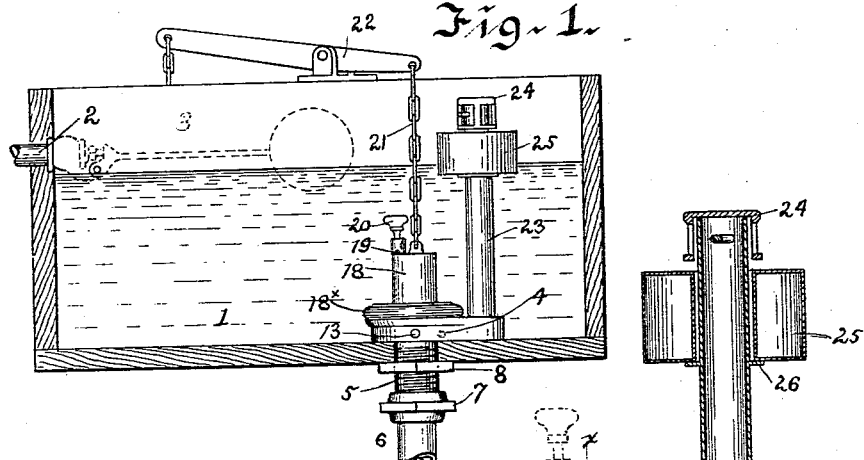
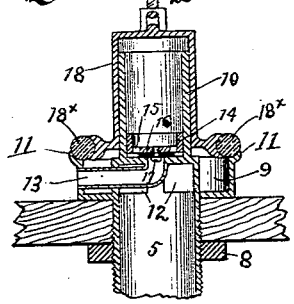
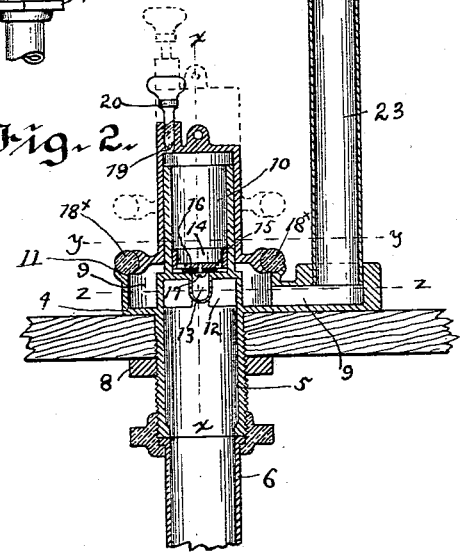
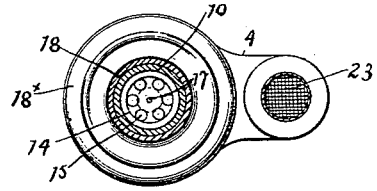
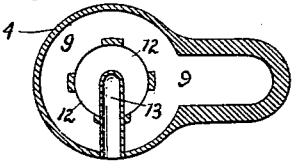
Witnesses
Thomas Durant
Wallace Murdock
Inventor
William T. Fox
by Church & Church
his Atty

UNITED STATES PATENT OFFICE.

WILLIAM T. FOX, OF ROCHESTER, NEW YORK.

TANK-VALVE FOR WATER-CLOSETS.

SPECIFICATION forming part of Letters Patent No. 557,659, dated April 7, 1896.

Application filed October 17, 1893. Serial No. 488,378. (No model.)

*To all whom it may concern:*

Be it known that I, WILLIAM T. FOX, of Rochester, in the county of Monroe and State of New York, have invented certain new and useful Improvements in Tank-Valves for Water-Closets; and I do hereby declare the following to be a full, clear, and exact description of the same, reference being had to the accompanying drawings, forming a part of this specification, and to the reference-numerals marked thereon.

My present invention has for its objects to provide an improved valve particularly adapted for the flushing-tanks of water-closets, that shall be cheap and simple in construction and operation and one that is capable of easy regulation so as to permit a greater or lesser quantity of water to pass out to the closet, as may be desired, and also one in which the parts most liable to wear may be readily replaced at slight cost when worn out.

To these and other ends the invention consists in certain novelties of construction and combinations of parts, all as will be hereinafter fully described and the novel features pointed out particularly in the claims at the end of this specification.

In the drawings, Figure 1 is a sectional view of a tank, showing my valve in elevation; Fig. 2, a longitudinal sectional view of the valve; Fig. 3, a sectional view on the line $x$ $x$ of Fig. 2; Fig. 4, a horizontal sectional view on the line $y$ $y$ of Fig. 2; Fig. 5, a similar view on the line $z$ $z$ of Fig. 2.

Similar reference-numerals in the several figures indicate similar parts.

The tank 1, in which my improved valve is shown, is provided with the usual supply-pipe 2, controlled by the usual float-valve 3. (Shown in dotted lines.)

The valve constituting the present invention is constructed with a casing or base-casting 4, having the pipe extension 5, passing through the bottom of the tank, to which the pipe 6, leading to the closet, is connected by a coupling 7, said extension 5 being preferably threaded exteriorly and provided with a clamp-nut 8 for forming a tight joint with the bottom of the tank. The upper part of the casing 4 is provided with a chamber 9, an upwardly-extending cylinder 10, and a valve-seat 11 around said cylinder, as in Figs. 2 and 3. The pipe extension 5 communicates with the chamber 9 by means of apertures 12, but the bottom of the cylinder 10 is closed, excepting for a pipe or channel 13, extending to the exterior of the casting 4, and therefore communicating with the tank. Arranged in the cylinder 10 and guided to move vertically therein is a valve 14, having apertures 15 for the passage of water, and attached to its lower side is a packing of rubber, leather, or similar material 16, adapted to close the passage 13 when the valve is down, as shown. This packing is attached by a screw 17, so that it can readily be replaced when worn and will operate to effectually prevent the passage of water.

The main valve consists of a cylinder 18, fitted closely to the cylinder 10 on the base-casting 4 and arranged to slide thereon, having the packing-ring $18^\times$, coöperating with the valve-seat 11, and the small aperture 19 at its upper end controlled by a screw-plug 20 for regulating the escape of water from the interior of the cylinder, as will be presently described. This valve is sufficiently heavy to close of itself and is adapted to be raised from the valve-seat by the chain 21, attached to one end of the usual lever 22, the other end being provided with a chain adapted to be actuated by the operator when desired to flush the closet.

Attached to the casting 4 and communicating with the chamber 9 is an overflow-pipe 23 extending up near the top of the tank, having a cap 24 and a surrounding float 25, the downward motion of which latter is limited by a collar 26 or similar device, and it will be understood that should the tank become too full and in danger of overflowing the float 25 will rise, lift the cap, and allow the water to enter chamber 9 and pass from thence to the closet through pipe 6, the cap serving simply as a means of preventing the escape of odors into the room, and also to prevent noise.

In operation the tank will normally be full of water, submerging the valve and filling the cylinder 10; but the valve will be closed on the seat 11, preventing the passage of water to the closet. When, now, it is desired to flush the closet, the operator lifts the valve by means of the operating cord or chain to the position shown in dotted lines, Fig. 2, allowing the water in the tank to enter the chamber 9 and pass thence through pipe 6. At the same time the upward movement of the cylinder 18 causes water to pass through passage 13, lifting the valve 14, and enter and fill the chamber 10. Then when the operating-chain is released, which may be as soon as the valve has been moved fully upward, the valve 14 closes and the confined body of water in the cylinders 10 and 18 can escape only through the small aperture 19 in the top of the valve-cylinder 18, and this being regulated by the screw-plug 20 the valve can be caused to close slowly, allowing a large quantity of water to pass to the closet, or if the plug 20 is opened the valve can be permitted to close rapidly.

While I have found in practice that this specific construction of valve is well adapted for the purpose intended, I do not desire to be confined to the precise arrangement shown.

The main valve-seat being entirely open is readily accessible and the parts of the valve very simple, and access can also be readily had to the valve 14 for the purpose of renewing the packing 16, if desirable.

Instead of securing the overflow-pipe to the valve-casing it could be otherwise located; but I prefer the arrangement shown, as it simplifies the construction and requires only a single aperture in the bottom of the tank. The valve herein described could be used for other purposes if desired, and instead of the particular form of valve 14 an ordinary check-valve could be employed, if desired.

By employing the cylinder 10 on the base 4 (which, for convenience merely, I have termed a "casting") I obtain a long bearing for the valve-cylinder, and the two cylinders being accurately turned a sufficiently tight joint can be obtained without extra packing, though the lower part of the cylinder 10 containing the valve forms the effective abutment, and the valve 14 may be dropped in the cylinder and its proper positioning and operation will be insured.

While I prefer to locate the plug 20, governing the discharge from the cylinder, on the top of the cylinder 18, as it is accessible and may be readily adjusted to govern the operation, it will be understood that it could, if desired, be located elsewhere, its position not being essential to the result.

I claim as my invention—

1. In a tank-valve, the combination with the valve-base having the valve-seat, the interior chamber and a passage connecting it with the exterior of the base, and the loose valve fitting the cylinder having the packing-washer thereon coöperating with said passage, of the valve coöperating with the valve-seat having the cylinder sliding over the cylinder on the base, and the discharge-passage from the cylinder normally closed or sealed and preventing the entrance of air when the valve is raised from its seat, substantially as described.

2. In a tank-valve, the combination with the base having the central abutment, an inlet-passage leading therefrom to the exterior of the base, and a check-valve therein, and a valve-seat around said abutment, of the valve having the cylinder covering said abutment and coöperating with the valve-seat and also having the discharge-passage from the cylinder normally closed or sealed and preventing the entrance of air when the valve is raised from its seat, substantially as described.

WILLIAM T. FOX.

Witnesses:
FRED F. CHURCH,
G. A. RODA.